US012792144B2

(12) United States Patent
Nokuo et al.

(10) Patent No.: US 12,792,144 B2
(45) Date of Patent: Nov. 10, 2026

(54) INPUT DEVICE, ACCESSORY COMPONENT OF INPUT DEVICE, AND INPUT DEVICE ASSEMBLY INCLUDING THESE

(71) Applicant: Sony Interactive Entertainment Inc., Tokyo (JP)

(72) Inventors: Taichi Nokuo, Tokyo (JP); Isao Okuyama, Chiba (JP); Takeshi Igarashi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/846,782

(22) PCT Filed: Mar. 20, 2023

(86) PCT No.: PCT/JP2023/010986
§ 371 (c)(1),
(2) Date: Sep. 13, 2024

(87) PCT Pub. No.: WO2023/189848
PCT Pub. Date: Oct. 5, 2023

(65) Prior Publication Data
US 2025/0244830 A1 Jul. 31, 2025

(30) Foreign Application Priority Data
Mar. 30, 2022 (JP) ................................ 2022-056493

(51) Int. Cl.
*G06F 3/01* (2006.01)

(52) U.S. Cl.
CPC .................................. *G06F 3/014* (2013.01)

(58) Field of Classification Search
CPC ...................................................... G06F 3/014
See application file for complete search history.

(56) References Cited

U.S. PATENT DOCUMENTS 10,824,244 B2 11/2020 Kin
2008/0063391 A1* 3/2008 Segawa ............... G03B 17/566
396/422

(Continued)

FOREIGN PATENT DOCUMENTS

CN 211044197 U 7/2020
JP 2019171094 A 10/2019

(Continued)

OTHER PUBLICATIONS

International Search Report for corresponding PCT Application No. PCT/JP2023/010986, 8 pages, dated Jun. 27, 2023.

(Continued)

*Primary Examiner* — Towfiq Elahi
(74) *Attorney, Agent, or Firm* — Kilpatrick Townsend & Stockton LLP

(57) ABSTRACT

An input device (10) has a main body (11) including a grip (11B) and an operating section (11A) in which an input button (13) and the like are disposed, an outer surface (31*a*, 31*b*) provided with a tracked portion (H) to be tracked by an external camera, an inner surface (31*c*, 31*e*) that faces a hand or wrist of a user while the user is holding the grip (11B), and an attaching opening (33) that is provided on the inner surface (31*c*, 31*e*) and to which an accessory component (60) is to be attached. With this arrangement, the influence of the accessory component (60) on the detection of the tracked portion (H) by the camera can be reduced when the accessory component (60) is attached to the attaching opening (33) of the input device (10).

11 Claims, 10 Drawing Sheets

(56) References Cited

U.S. PATENT DOCUMENTS

| | | | | |
|---|---|---|---|---|
| 2017/0052750 | A1* | 2/2017 | Koizumi | A63F 13/98 |
| 2018/0099219 | A1* | 4/2018 | Hope | A63F 13/218 |
| 2020/0159337 | A1 | 5/2020 | Kin | |
| 2023/0191243 | A1 | 6/2023 | Taichi | |

FOREIGN PATENT DOCUMENTS

| | | | |
|---|---|---|---|
| JP | 2021505996 | A | 2/2021 |
| JP | 2022509769 | A | 1/2022 |
| WO | 2019113243 | A1 | 6/2019 |
| WO | 2021240930 | A1 | 12/2021 |

OTHER PUBLICATIONS

Nishino Hideaki, "Next-gen VR on PS5: the new controller," PlayStation Blog, <URL: https://blog.playstation.com/2021/03/18/next-gen-vr-on-ps5-thenew-controller/>, 5 pages, Mar. 18, 2021 (for relevancy, see Non-Pat. Lit. #1).

EP23779864.0, "Partial Supplementary European Search Report", May 8, 2026, 14 pages.

EP23779864.0, "Extended European Search Report", Jul. 29, 2026, 12 pages.

* cited by examiner

INPUT DEVICE, ACCESSORY COMPONENT OF INPUT DEVICE, AND INPUT DEVICE ASSEMBLY INCLUDING THESE

TECHNICAL FIELD

The present disclosure relates to an input device, an accessory component of the input device, and an input device assembly including these.

BACKGROUND ART

There is a technique for tracking the position and posture of an input device by providing a light emitting portion on an outer surface of the input device and detecting light from the light emitting portion with a camera. PCT Patent Publication No. WO2021/240930 discloses an input device in which a plurality of light emitting portions are arranged on the outer surface.

SUMMARY

Technical Problem

The visibility of the light emitting portion by the camera is important for the accuracy of detecting the position and the like of the input device. When the camera is prevented from detecting the light from the light emitting portion, the accuracy of detecting the position and the like of the input device is reduced. In some cases, an accessory component such as a strap is attached to the input device. There is a desire to reduce the possibility that the accessory component will interfere with light detection by the camera, while maintaining the attached state of the accessory component to the input device during operation of the input device.

Further, it is desirable that such an accessory component can easily be attached and detached as necessary.

Solution to Problem

The input device proposed in the present disclosure is an input device that is used while being worn by a user. The input device includes a main body having an operating section in which an input member is disposed, an outer surface provided with a tracked portion to be tracked by an external device, an inner surface that faces a hand or wrist of the user when the device is worn on the user, and an attaching portion that is provided on the inner surface and to which an accessory component is to be attached. According to this input device, when the accessory component is attached to the attaching portion, the influence of the accessory component on the detection of the tracked portion by a camera can be reduced.

The accessory component proposed in the present disclosure is capable of being attached to and detached from an input device. The accessory component has an attached portion. The attached portion has a fitting part to be fitted into an attaching opening formed in the input device and a base. The fitting part has a first engagement protrusion that protrudes in a first direction that intersects a fitting direction of the fitting part into the attaching opening. The base covers the first engagement protrusion when the attached portion is viewed in the fitting direction, and a gap is secured between the base and the first engagement protrusion. According to this accessory component, the work of attaching and detaching the accessory component to and from the attaching opening of the input device can be facilitated.

The input device assembly proposed in the present disclosure includes an input device and an accessory component capable of being attached to and detached from the input device. An attaching opening is formed in the input device. The accessory component has an attached portion to be attached to the attaching opening. The attached portion has a fitting part to be fitted into the attaching opening and a base. The fitting part has a first engagement protrusion that protrudes in a first direction intersecting a fitting direction of the fitting part into the attaching opening. The base covers the first engagement protrusion when the attached portion is viewed in the fitting direction, with a gap secured between the base and the first engagement protrusion. The attaching opening has a shape corresponding to the fitting part. The attached portion is rotatable relative to the attaching opening around a center line extending in the fitting direction, between an engagement position and a release position. Attachment and detachment of the attaching opening and the attached portion are allowed in the release position, and, in the engagement position, an edge of the attaching opening is disposed in the gap between the base and the first engagement protrusion, thereby causing the fitting part to engage with a peripheral portion of the attaching opening. According to this assembly, the work of attaching and detaching the accessory component to and from the attaching opening of the input device can be facilitated.

DESCRIPTION OF EMBODIMENT

In the following, examples of an input device, an accessory component, and an input device assembly including these proposed in the present disclosure will be described. In the present description, the directions indicated by Z1 and Z2 in FIG. 2 are referred to as upward and downward, respectively, the directions indicated by Y1 and Y2 in FIG. 2 are referred to as forward and rearward, respectively, and the directions indicated by X1 and X2 in FIG. 2 are referred to as rightward and leftward, respectively. These directions correspond to the directions seen from a user when the user is holding and using an input device 10, as illustrated in FIG. 1.

Overview of System

Figure 1:
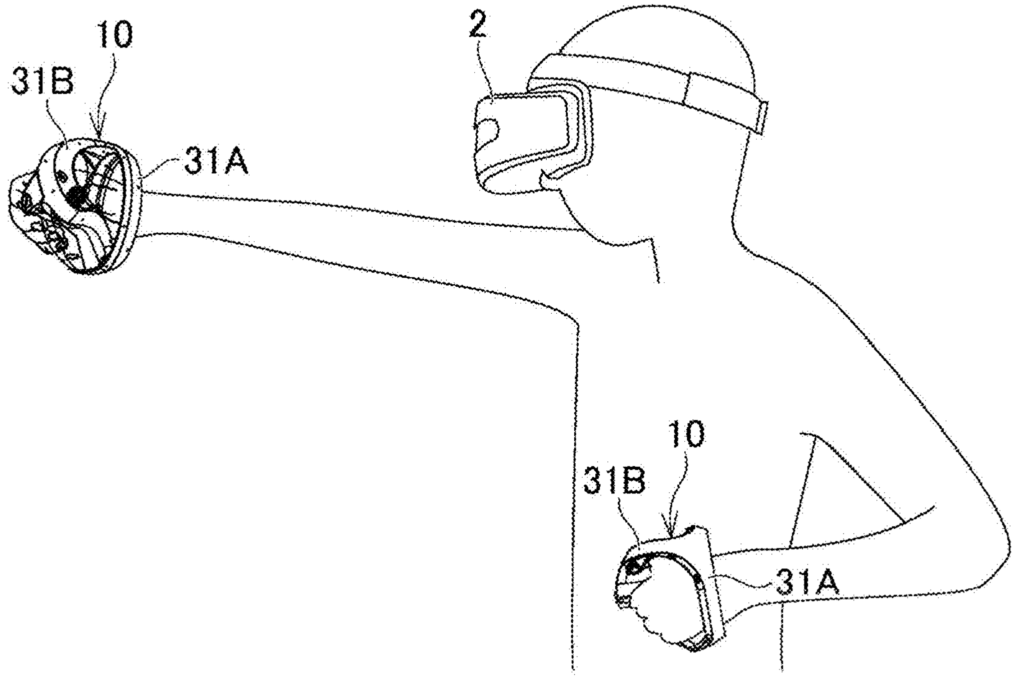
FIG. 1 is a perspective view illustrating an example of a usage state of an input device proposed in the present disclosure.
Figure 2:
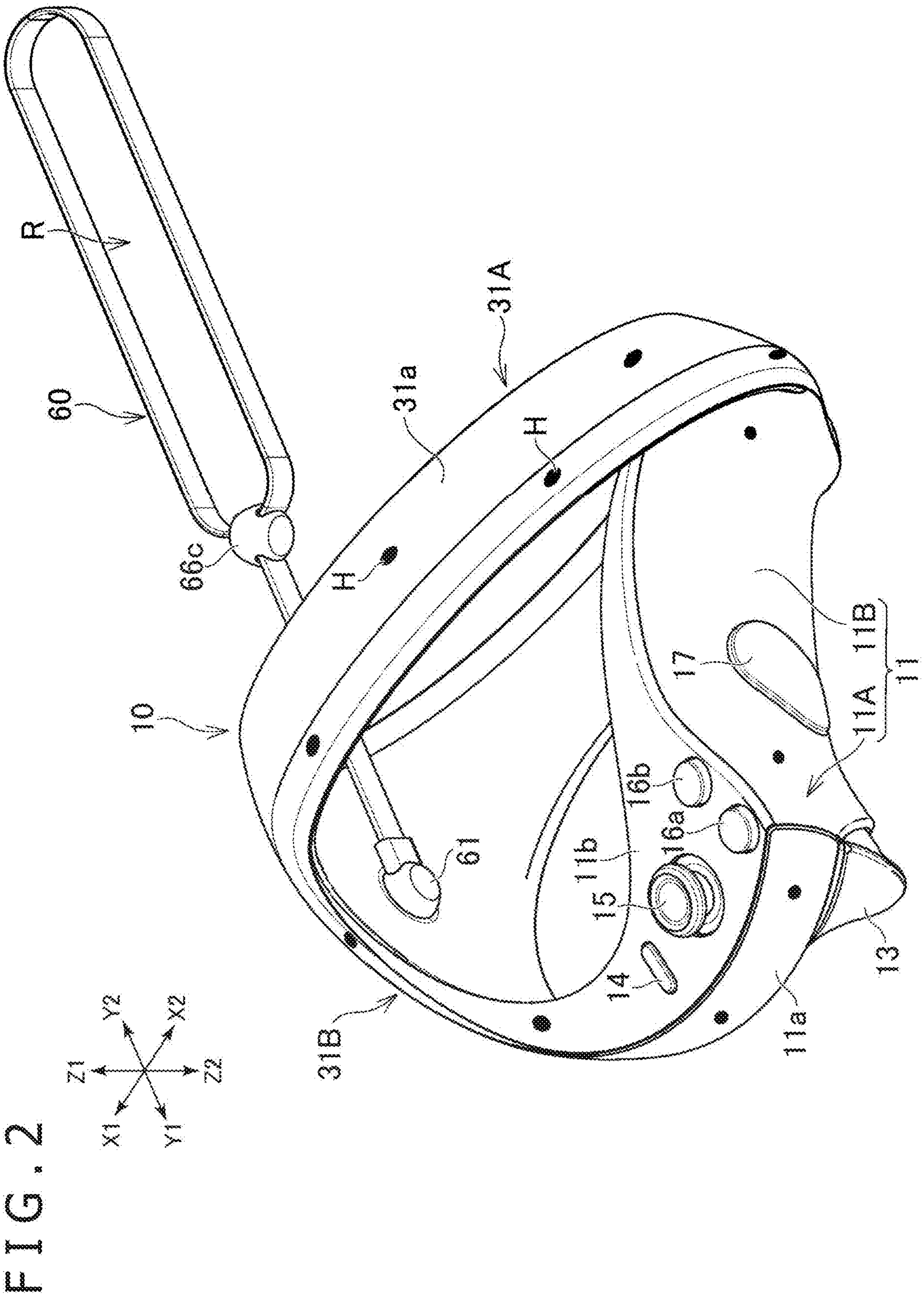
FIG. 2 is a perspective view illustrating the input device and an accessory component.

As illustrated in FIG. 1, the input device 10 is a device used while worn by a user. For example, the input device 10 is a device that is used while the user is holding a grip 11B (see FIG. 2), which will be described later. The input device 10 may be a device that is used with a part of the device attached to the user's hand. The input device 10 is used together with a head mounted display (HMD) 2, for example. The user wears the HMD 2 on his/her head and holds the input device 10 in the right hand and/or the left hand. The HMD 2 has a camera facing forward. The input device 10 is provided with a plurality of tracked portions H (see FIG. 2), which will be described later. The tracked portions H are light emitting parts that emit light. The positions of the tracked portions H are detected by the camera by use of the light from the tracked portions H. Then, on the basis of the detected positions of the tracked portions H, the position, posture, movement, and the like of the input device 10 are calculated.

Calculation of the position and the like of the input device 10 may be performed by an information processing device installed in the HMD 2 or may be executed by an external information processing device (for example, a game device separate from the HMD 2, a personal computer, and a server device). Further, generation of moving images such as game images may be executed by an information processing device installed in the HMD 2 or may be executed by an external information processing device.

Note that the camera that detects the light of the tracked portions H may be installed in a device different from the HMD 2. For example, one or more cameras may be arranged around the user. Then, the light from the tracked portions H may be detected by the cameras. In this case, an information processing device mounted on the HMD 2, a personal computer, or the like may calculate the position and the like of the input device 10 on the basis of information from the cameras. Moreover, the input device 10 does not necessarily have to be used together with the HMD 2. Instead of the HMD 2, a stationary display may be used.

Main Body of Input Device

The input device 10 for the right hand will be described below in detail. Note that the outer shape of the input device 10 for the right hand and the outer shape of the input device 10 for the left hand may be symmetrical. Accordingly, the following description of relative positions of elements (members, parts) of the input device 10 for the right hand can also be applied to the input device 10 for the left hand by reversing "rightward," "right side," "leftward," and "left side" in the description. The number and type of input buttons and the like operated by the user's fingers may be different between the right and left input devices 10. The arrangement of the input buttons and the like of the input device 10 for the right hand and that of the input device 10 for the left hand do not have to be symmetrical.

As illustrated in FIG. 2, a main body 11 of the input device 10 includes the grip 11B and an operating section 11A in which a plurality of input members are disposed. The main body 11 has the operating section 11A on its upper part, and the grip 11B extends downward from the operating section 11A. The grip 11B may extend diagonally downward and rearward from the operating section 11A, for example.

The grip 11B is held by, for example, the ball of the thumb, the middle finger, the ring finger, and the little finger. The input members disposed in the operating section 11A can be operated with the thumb, the index finger, or the middle finger while the grip 11B is held.

Input Member

As illustrated in FIG. 2, the operating section 11A includes input buttons 13, 14, 16*a*, and 16*b* and an input stick 15 as an example of input members. The input button 13 is disposed on a front surface 11*a* of the operating section 11A and is operated with the index finger, for example. The input button 13 may be a trigger button that is rotatable around an axis, or may be a push button that is capable of a parallel shift in the front-rear direction. The input buttons 14, 16*a*, and 16*b* and the input stick 15 are disposed on an upper surface 11*b* of the operating section 11A and are operated with the thumb, for example. The input stick 15 is an input member that can be tilted or slid in a radial direction. Further, an input button 17 may be disposed also on the grip 11B. The input button 17 may be operable with the middle finger. The input members provided in the operating section 11A and the grip 11B are not limited to the example illustrated in FIG. 2. For example, a touch sensor or a button with a touch sensor may be provided in the operating section 11A.

Tracked Portion

As illustrated in FIG. 2, the input device 10 may include a device rear part 31A and a device side part 31B that are located rearward of the operating section 11A.

The device rear part 31A is annular, for example, and surrounds the user's wrist when the user is grasping the grip 11B. In other words, as illustrated in FIG. 1, the user can put the user's hand inside the device rear part 31A and grasp the grip 11B. The device rear part 31A is a closed ring and may surround the user's wrist 360 degrees. A rear end (lower end) of the grip 11B may be connected to the lowest part of the device rear part 31A.

Unlike the example illustrated in FIG. 2, the device rear part 31A may have an arcuate shape surrounding only an upper portion of the user's wrist, for example. Further, the device rear part 31A is circular but may be oval or polygonal when viewed from the rear of the input device 10.

Figure 4:
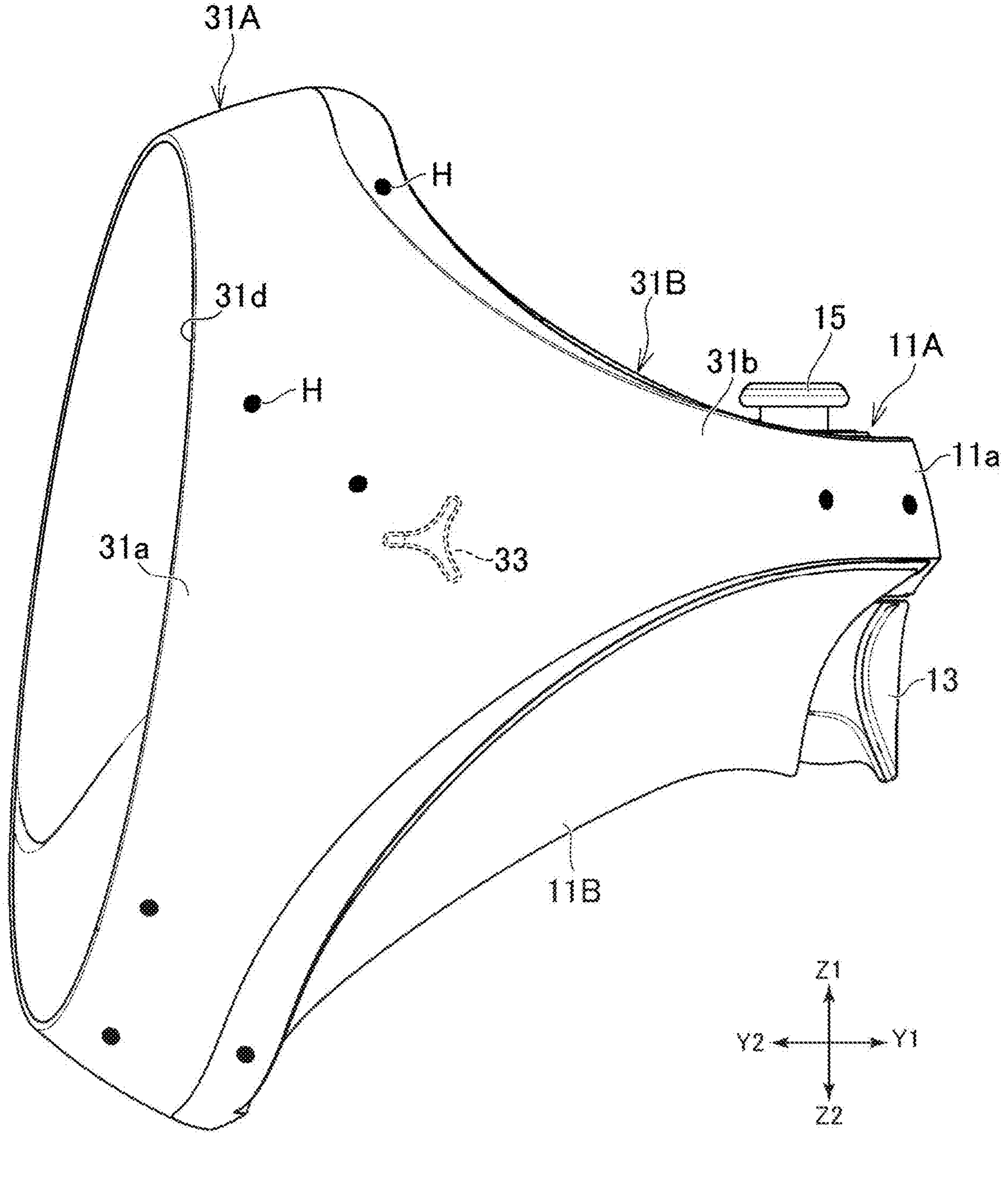
FIG. 4 is a side view of the input device.
Figure 5:
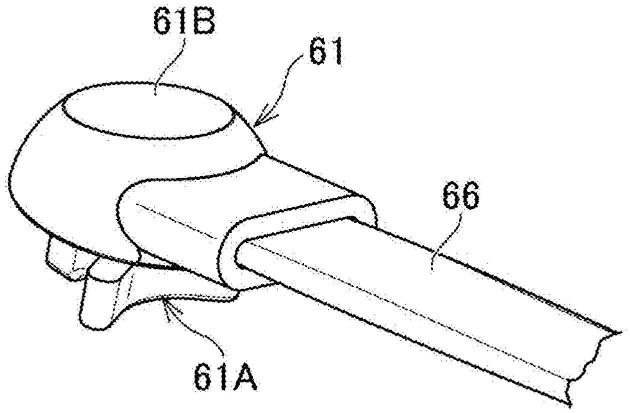
FIG. 5 is a perspective view of an attached portion of the accessory component.

As illustrated in FIG. 4, the device side part 31B extends forward from the device rear part 31A and is connected to the operating section 11A. The device side part 31B extends forward from a right part of the device rear part 31A and is curved to be connected to a right part of the operating section 11A (see FIG. 2). As illustrated in FIG. 1, when the user is holding the grip 11B, the device side part 31B is disposed along the back of the hand and the index finger, for example.

The shape of the device side part 31B is also not limited to the example illustrated in FIG. 2 and the like. For example, the device side part 31B may be formed to cover the front side of the grip 11B or to cover the upper surface of the operating section 11A. Further, while the rear part of the device side part 31B is connected to the device rear part 31A, the front part of the device side part 31B does not have to be connected to the operating section 11A. In contrast, while the front part of the device side part 31B is connected to the operating section 11A, the rear part of the device side part 31B does not have to be connected to the device rear part 31A.

As illustrated in FIG. 2, the plurality of tracked portions H are provided on an outer surface of the input device 10. (All the black circles illustrated in FIG. 2 are the tracked portions H.) A light emitting element (specifically, a light emitting diode (LED)) is disposed at a position corresponding to each tracked portion H. The outer surface of the input device 10 is configured by an exterior member that covers the LEDs and that transmits light, for example. Unlike this, the light emitting element may be disposed apart from the tracked portion H. Then, the light from the light emitting element may be guided to the exterior member (the position of the tracked portion H) through a light guiding member.

As illustrated in FIG. 2, the tracked portion H is provided on an outer surface 31*a* of the device rear part 31A. The device rear part 31A may include the plurality of tracked portions H arranged in an extending direction (circumferential direction) of the device rear part 31A. The tracked portions H may be distributed over the entire circumference of the device rear part 31A. As described above, the device rear part 31A has such a shape that surrounds the user's wrist. According to this shape of the device rear part 31A, the influence of the posture and the like of the input device 10 on the accuracy of detecting the tracked portions H by use of the camera can be reduced. For example, even in the case where the user reverses the posture of the input device 10 in the vertical direction, the camera of the HMD 2 can detect the light from the tracked portions H. As a result, the accuracy of detecting the position and the like of the input device 10 can be improved.

Further, the tracked portions H may also be provided on an outer surface 31*b* of the device side part 31B (see FIG. 4) or the front surface 11*a* of the operating section 11A (see FIG. 2). This also makes it possible to reduce the influence of the posture of the input device 10 on the accuracy of detecting the tracked portions H by use of the camera. As a result, the accuracy of detecting the position and the like of the input device 10 can be improved.

The arrangement of the tracked portions H is not limited to the example illustrated in FIG. 2 and the like. For example, the tracked portion H does not have to be provided on the outer surface 31*b* of the device side part 31B. Further, the tracked portion H does not have to be provided on the front surface 11*a* of the operating section 11A.

Accessory Component

Figure 3:
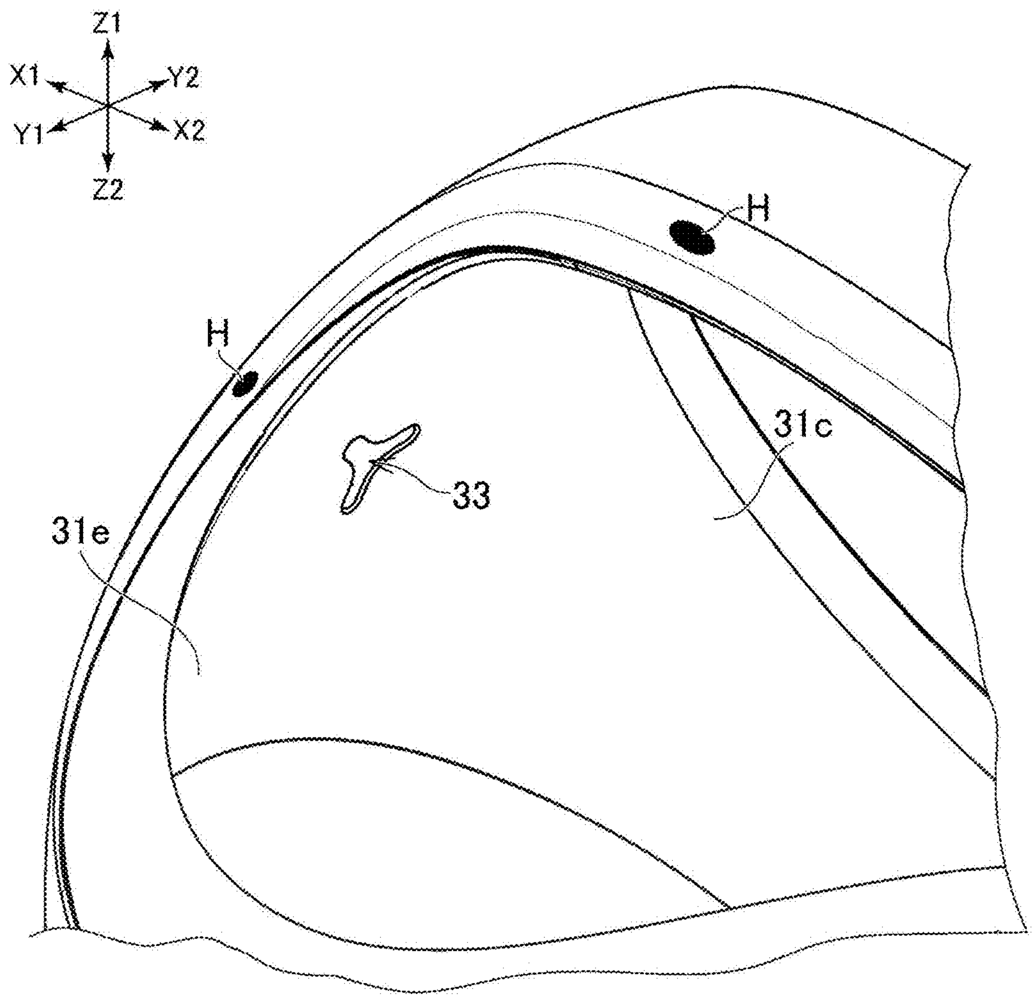
FIG. 3 is an enlarged view of the input device from which the accessory component has been detached.

As illustrated in FIG. 2, an accessory component 60 is attached to the input device 10. The accessory component 60 is a strap that connects the user's wrist and the input device 10, for example. The accessory component 60 has an attached portion 61 at its front end to be attached to the input device 10. The attached portion 61 can be attached to and detached from an attaching opening 33 (FIG. 3) formed in the input device 10.

Further, the accessory component 60 has a connecting cord 66 extending from the attached portion 61. A rear end of the connecting cord 66 is attached to another portion of the connecting cord 66 (a portion between the rear end and the attached portion 61) by a fastening portion 66*c* and constitutes a ring R. The user puts the user's hand into this ring R and holds the grip 11B. Even if the user unintentionally releases the grip 11B, the input device 10 remains connected to the wrist by the accessory component 60. When the user moves the wrist positioned in the ring R rearward, the fastening portion 66*c* moves, and the size of the ring R may be made to match the size of the user's wrist.

Position of Attaching Opening

The input device 10 has inner surfaces 31*c* and 31*e* (see FIG. 3) that face the user's hand or wrist when the user is holding the grip 11B. The inner surfaces 31*c* and 31*e* are surfaces that are exposed to the exterior on a side opposite to the outer surfaces 31*a* and 31*b* on which the plurality of tracked portions H are provided. The attaching opening 33 to which the attached portion 61 of the accessory component 60 is attached is formed in these inner surfaces 31*c* and 31*e*. Therefore, when the accessory component 60 is attached to the attaching opening 33, the influence of the accessory component 60 on the detection of the tracked portions H by the camera can be reduced. Further, a decrease in the degree of freedom of positioning of the tracked portions H provided on the outer surfaces 31*a* and 31*b* can be suppressed.

As described above, the input device 10 has the device rear part 31A located rearward of the main body 11 and shaped to surround the user's hand or wrist. At least a part of the attaching opening 33 is formed in the inner surface 31*c* of the device rear part 31A. The entire attaching opening 33 may be located in the device rear part 31A, or only a part of the attaching opening 33 may be located in the device rear part 31A and the remaining part of the attaching opening 33 may be located in another portion of the input device 10 (for example, in the device side part 31B).

As illustrated in FIG. 4, the attaching opening 33 may be formed at a position higher than the bottom of the annular device rear part 31A. With this arrangement, the length of the connecting cord 66 hanging downward from the annular device rear part 31A can be reduced. As a result, the connecting cord 66 can be prevented from getting caught in an unintended place.

Further, as illustrated in FIG. 4, the attaching opening 33 may be formed at a position lower than the top of the annular device rear part 31A. The device rear part 31A is annular and open so as to allow the user to insert the user's hand therein. In other words, the device rear part 31A extends outward in the right-left direction from the top thereof and also extends outward in the right-left direction from the bottom of the device rear part 31A. Therefore, by forming the attaching opening 33 between the top and the bottom, a clearance can be secured between the attached portion 61 and the user's hand while the accessory component 60 is attached to the attaching opening 33. As a result, interference between the user's hand and the attached portion 61 can be prevented.

The device rear part 31A extends downward from its top in a curved manner. The device side part 31B extends forward from the device rear part 31A. As illustrated in FIG. 4, the attaching opening 33 may be located at a connecting portion between the device rear part 31A and the device side part 31B. That is, a part of the attaching opening 33 may be located at the device rear part 31A, and the remaining part may be located at the device side part 31B.

According to this structure, it becomes easy to increase the distance between the attaching opening 33 and a rear edge 31*d* of the device rear part 31A. Therefore, the length of the connecting cord 66 extending outward from the annular device rear part 31A can be reduced. As a result, the connecting cord 66 can be prevented from getting caught in an unintended place. Further, the connecting portion between the device rear part 31A and the device side part 31B has higher rigidity than other portions of the device rear part 31A. By forming the attaching opening 33 in the connecting portion, an external force acting on the input device 10 from the accessory component 60 can be received by this highly rigid portion.

Note that the position of the attaching opening 33 is not limited to the example described here. For example, the entire attaching opening 33 may be located on the inner surface 31*e* of the device side part 31B. Further, the attaching opening 33 may be formed in the inner surface 31*c* at a left portion of the device rear part 31A.

Details of Attaching Structure

The attaching opening 33 of the input device 10 and the attached portion 61 of the accessory component 60 will be described in detail.

Figure 6:
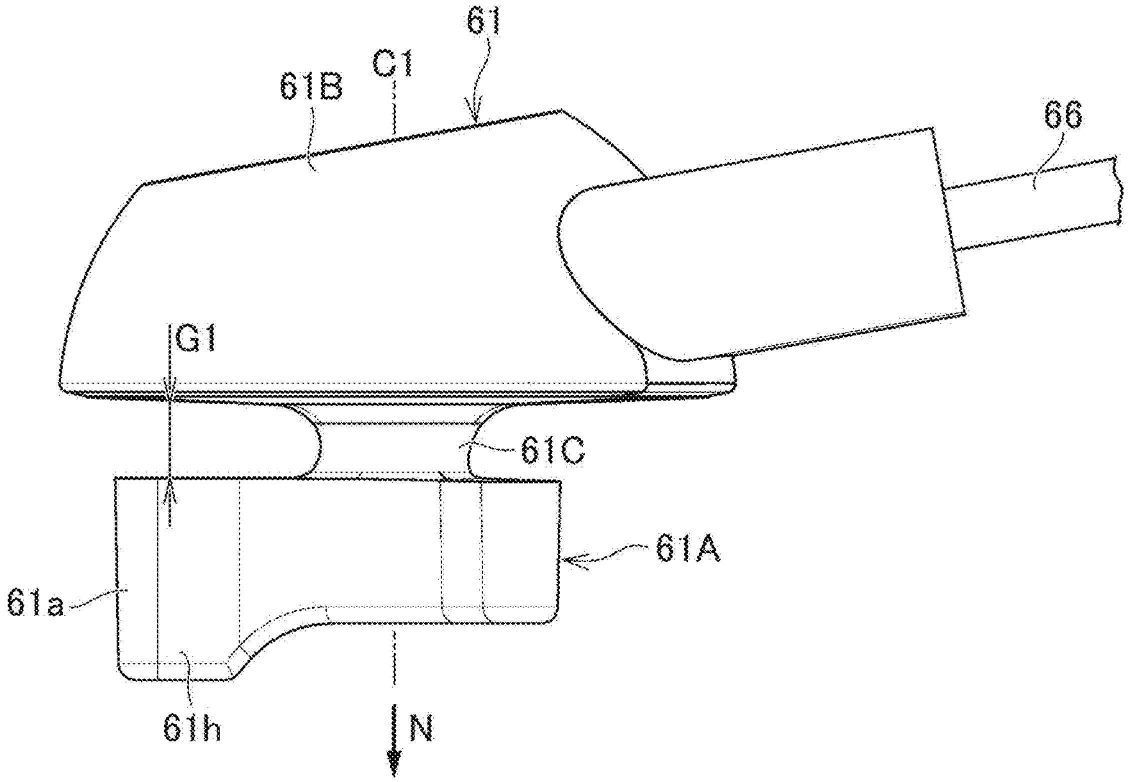
FIG. 6 is a side view of the attached portion of the accessory component.

As illustrated in FIG. 6, the attached portion 61 of the accessory component 60 has a fitting part 61A, a base 61B, and a central part 61C. The fitting part 61A is a portion to be fitted inside the attaching opening 33 formed in the input device 10. The central part 61C protrudes from the base 61B in a fitting direction of the fitting part 61A (attachment/detachment direction between the attached portion 61 and the attaching opening 33, i.e., N direction in FIG. 6) and is connected to the fitting part 61A.

Figure 7:
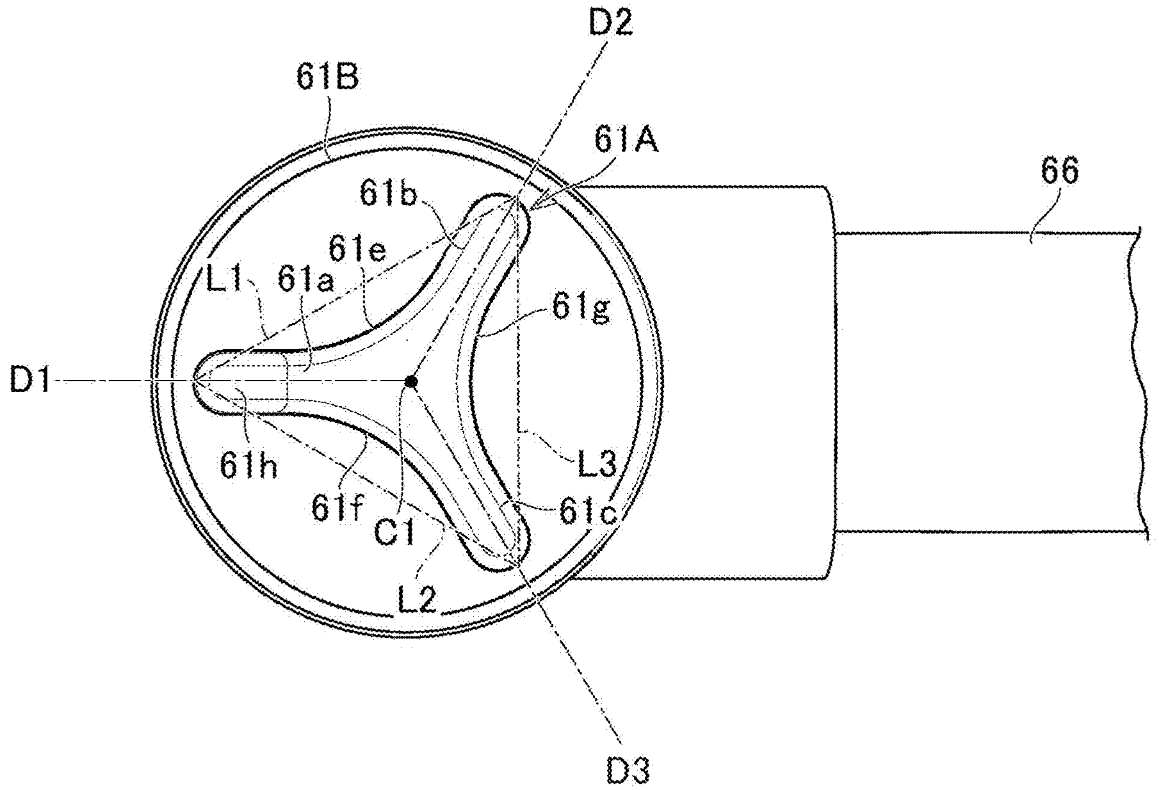
FIG. 7 is a view of a fitting part of the attached portion of the accessory component, viewed in a fitting direction.

As illustrated in FIG. 7, the fitting part 61A has engagement protrusions 61*a*, 61*b*, and 61*c* that protrude in a direction intersecting (perpendicular to, in the example of FIG. 7) the fitting direction N. For example, the fitting part 61A has a first engagement protrusion 61*a* that protrudes in a first direction (D1) intersecting (perpendicular to, in the example of FIG. 7) the fitting direction N. Further, the fitting part 61A has a second engagement protrusion 61*b* and a third engagement protrusion 61*c*. The second engagement protrusion 61*b* protrudes in a second direction (D2) intersecting (perpendicular to, in the example of FIG. 7) the fitting direction N. The third engagement protrusion 61*c* protrudes in a third direction (D3) intersecting (perpendicular to, in the example of FIG. 7) the fitting direction. In this way, the fitting part 61A may have the plurality of engagement protrusions 61*a*, 61*b*, and 61*c* that are branched and protrude in a plurality of directions perpendicular to the fitting direction N. These plurality of engagement protrusions 61*a*, 61*b*, and 61*c* may protrude from the position of a center line C1 of the fitting part 61A extending in the fitting direction N.

As illustrated in FIGS. 6 and 7, the base 61B is formed to cover the engagement protrusions 61*a*, 61*b*, and 61*c* when the attached portion 61 is viewed in the fitting direction N. For example, the base 61B is circular, and the radius of the base 61B is larger than the distance from the center line C1 of the fitting part 61A to the engagement protrusions 61*a*, 61*b*, and 61*c*. A gap G1 (see FIG. 6) is secured between the engagement protrusions 61*a*, 61*b*, and 61*c* and the base 61B.

Figure 10:
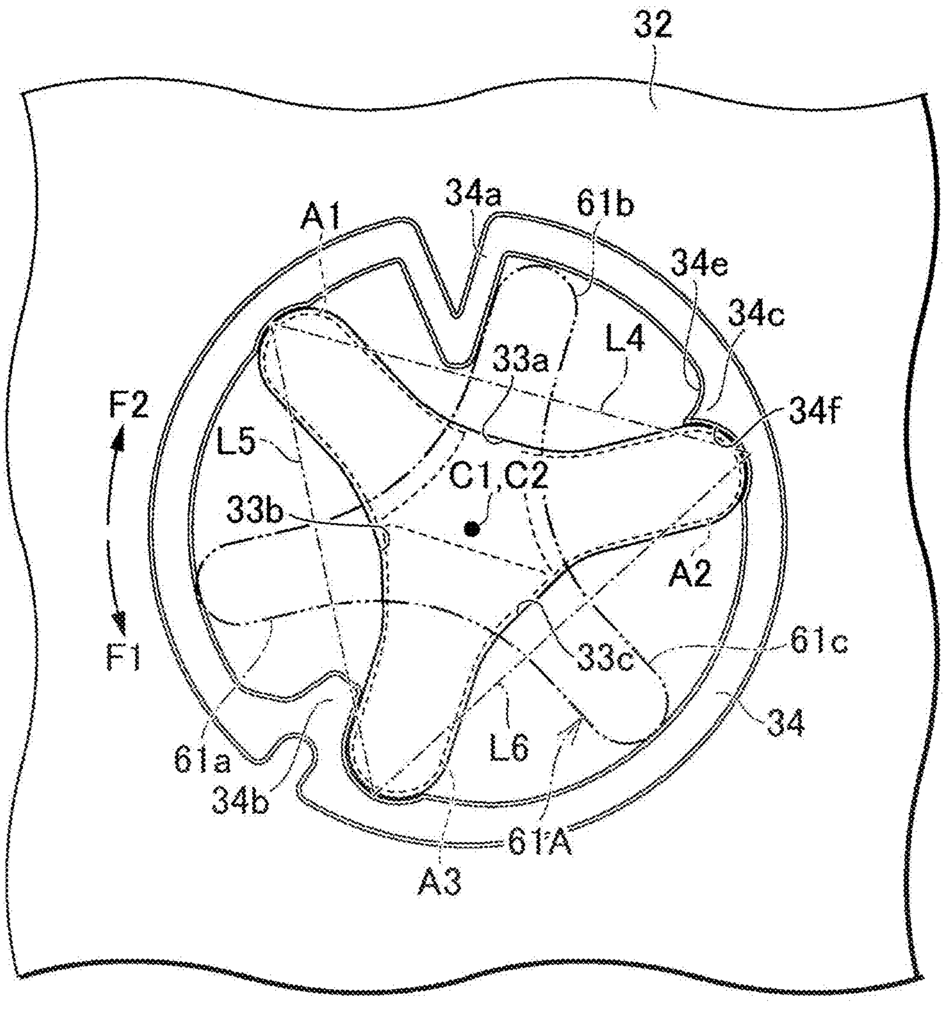
FIG. 10 is a diagram illustrating an attaching opening formed in the input device and a peripheral wall formed around the attaching opening.

The attaching opening 33 has a shape corresponding to the fitting part 61A. As illustrated in FIG. 10, the attaching opening 33 includes, for example, a first opening area A1 having a shape corresponding to the first engagement protrusion 61*a*, and a second opening area A2 having a shape corresponding to the second engagement protrusion 61*b*, and a third opening area A3 having a shape corresponding to the third engagement protrusion 61*c*. The first opening area A1 extends in the first direction (D1, see FIG. 7) from the position of a center line C2 of the attaching opening 33 extending in the fitting direction N. The second opening area A2 extends from the position of the center line C2 in the second direction (D2, see FIG. 7), and extends from the position of the center line C2 in the third direction (D3, see FIG. 7). In this way, the attaching opening 33 may have the plurality of opening areas A1, A2, and A3 branched and extending in a plurality of directions perpendicular to the center line C2. The plurality of opening areas A1, A2, and A3 may extend from the position of the center line C2 of the attaching opening 33.

The attaching opening 33 is formed in an inner panel 32 (see FIG. 9) that constitutes the inner surface 31*c* of the device rear part 31A and the inner surface 31*e* of the device side part 31B. On the outside of the inner panel 32 (between the inner panel 32 and an outer panel 35), a space S in which the fitting part 61A is disposed and which allows rotation of the fitting part 61A (see FIG. 9) is formed.

When fitted into the attaching opening 33, the attached portion 61 may be disposed in such a manner that the center line C1 of the attached portion 61 (see FIG. 7) coincides with the center line C2 of the attaching opening 33 (see FIG. 10). Then, the attached portion 61 may be rotatable relative to the attaching opening 33 around the center lines C1 and C2 extending in the fitting direction N. The attached portion 61 may be rotatable between an engagement position and a release position. When the attached portion 61 is in the release position, the positions of the engagement protrusions 61*a*, 61*b*, and 61*c* of the fitting part 61A coincide with those of the opening areas A1, A2, and A3 of the attaching opening 33, respectively. Therefore, attachment and detachment in the fitting direction N between the attached portion 61 and the attaching opening 33 are allowed. In FIG. 10, a two-dot chain line indicates the fitting part 61A when the attached portion 61 is in the engagement position. When the attached portion 61 is in the engagement position, edges 33*a*, 33*b*, and 33*c* of the attaching opening 33 are disposed in the gap G1 and are sandwiched between the base 61B and the engagement protrusions 61*a*, 61*b*, and 61*c*. Then, the engagement protrusions 61*a*, 61*b*, and 61*c* engage with a peripheral portion of the attaching opening 33. This restricts separation of the attached portion 61 from the attaching opening 33.

The user can attach the attached portion 61 to the input device 10 by fitting the fitting part 61A of the attached portion 61 into the attaching opening 33 and rotating the attached portion 61 from the release position to the engagement position. Further, the user can detach the attached portion 61 from the input device 10 by rotating the attached portion 61 in the engagement position to the release position.

In the example illustrated in FIG. 7, the fitting part 61A has the three engagement protrusions 61*a*, 61*b*, and 61*c*, and the base 61B covers the three engagement protrusions 61*a*, 61*b*, and 61*c*. As described above, the base 61B is circular with a radius larger than the distance from the center line C1 to the engagement protrusions 61*a*, 61*b*, and 61*c*, for example. With this shape of the base 61B, the attaching opening 33 is closed by the base 61B when the attached portion 61 is in the engagement position and also when the attached portion 61 is in the release position.

Note that the shape of the fitting part 61A is not limited to the example described here. For example, the number of engagement protrusions that the fitting part 61A has may be two or one. Further, the number of engagement protrusions may be greater than three.

Further, the shape of the base 61B is not limited to the example described here as long as the shape covers the engagement protrusions 61*a*, 61*b*, and 61*c*. For example, the base 61B may have a polygonal shape when the attached portion 61 is viewed in a direction parallel to the fitting direction N. Also in this case, the plurality of engagement protrusions 61*a*, 61*b*, and 61*c* are entirely covered by the base 61B.

Shapes of Attaching Opening and Fitting Part

As illustrated in FIG. 7, the angle between the first direction (D1) in which the first engagement protrusion 61*a* protrudes and the second direction (D2) in which the second engagement protrusion 61*b* protrudes is less than 180 degrees. Similarly, the angle between the first direction (D1) and the third direction (D3) is also smaller than 180 degrees. The angles between the three directions may be equal. That is, the angle between the directions in which two adjacent ones of the engagement protrusions 61*a*, 61*b*, and 61*c* protrude (for example, the angle between the first direction (D1) and the second direction (D2)) may be 120 degrees.

As illustrated in FIG. 7, the fitting part 61A has a curved outer edge 61*e* extending from a vertex of the first engagement protrusion 61*a* to a vertex of the second engagement protrusion 61*b*. This outer edge 61*e* is curved in such a manner as to be recessed toward the center line C1 of the fitting part 61A with respect to a straight line L1 connecting the vertices of the two engagement protrusions 61*a* and 61B.

Similarly, the fitting part 61A has a curved outer edge 61*f* extending from the vertex of the first engagement protrusion 61*a* to a vertex of the third engagement protrusion 61*c*. This outer edge 61*f* is also curved in such a manner as to be recessed toward the center line C1 of the fitting part 61A with respect to a straight line L2 connecting the vertices of the two engagement protrusions 61*a* and 61*c*. Further, the fitting part 61A has a curved outer edge 61*g* extending from the vertex of the second engagement protrusion 61*b* to the vertex of the third engagement protrusion 61*c*. This outer edge 61*g* is curved in such a manner as to be recessed toward the center line C1 of the fitting part 61A with respect to a straight line L3 connecting the vertices of the engagement protrusions 61*b* and 61*c*.

The attaching opening 33 also has a shape similar to that of the fitting part 61A. That is, as illustrated in FIG. 10, the inner edge 33*a* of the attaching opening 33 connecting a tip of the first opening area A1 and a tip of the second opening area A2 protrudes toward the center line C2 with respect to a straight line L4 connecting the tips of the opening areas A1 and A2. Similarly, the inner edge 33*b* of the attaching opening 33 connecting the tip of the first opening area A1 and a tip of the third opening area A3 protrudes toward the center line C2 with respect to a straight line L5 connecting the tips of the opening areas A1 and A3. The inner edge 33*c* of the attaching opening 33 connecting the tip of the second opening area A2 and the tip of the third opening area A3 protrudes toward the center line C2 with respect to a straight line L6 connecting the tips of the opening areas A2 and A3.

Therefore, when the attached portion 61 is rotated with respect to the attaching opening 33, an engagement range between the engagement protrusions 61*a*, 61*b*, and 61*c* and the peripheral portion of the attaching opening 33 can be increased. As a result, the strength of attachment of the attached portion 61 to the attaching opening 33 can be increased. Incidentally, the engagement range here means the portion of the engagement protrusions 61*a*, 61*b*, and 61*c* that protrude outward beyond the edges 33*a*, 33*b*, and 33*c* of the attaching opening 33 when the attached portion 61 is in the engagement position (in the position indicated by the two-dot chain line in FIG. 10).

The number of engagement protrusions 61*a*, 61*b*, and 61*c* that the fitting part 61A has (in other words, the number of opening areas A1, A2, and A3 that the attaching opening 33 has) may be more than three. For example, the numbers of these may be four or five. Even in this case, in the attached portion 61, the outer edge between the vertices of two adjacent engagement protrusions may be curved in such a manner as to be recessed toward the center line C1 with respect to the straight line connecting the two vertices. In contrast, in the attaching opening 33, the inner edge between the vertices of two adjacent opening areas may be curved in such a manner as to protrude toward the center line C2 with respect to the straight line connecting the two vertices.

Further, unlike the example illustrated in the drawings, the angles between the three directions D1, D2, and D3 in which the engagement protrusions 61*a*, 61*b*, and 61*c* extend, respectively, do not have to be equal.

Moreover, the outer edges 61*e*, 61*f*, and 61*g* of the fitting part 61A may be curved along an arc as illustrated in FIG. 7 or may be bent at a position in the middle thereof.

Regulation of Rotation Range

Figure 8:
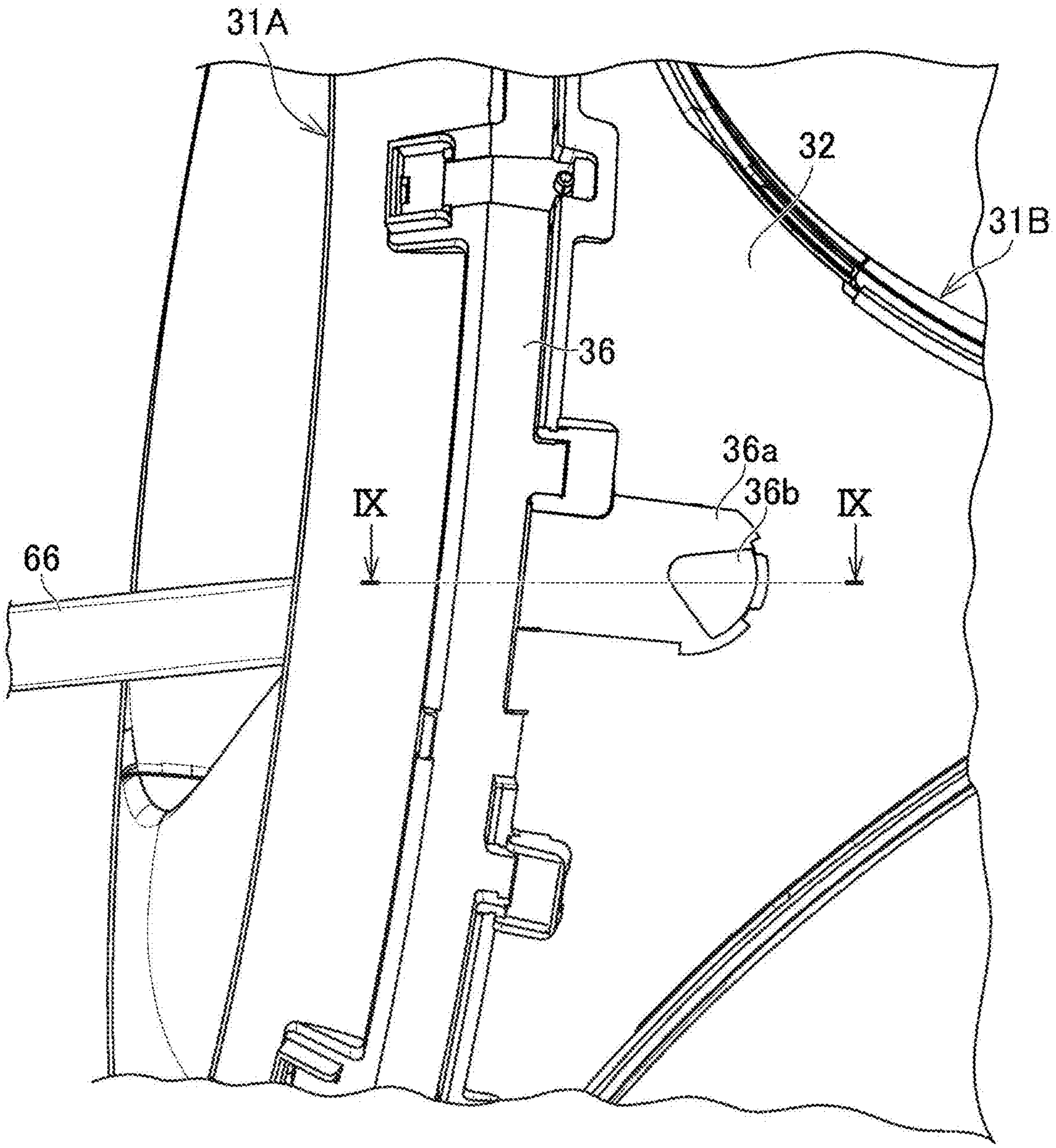
FIG. 8 is a perspective view illustrating the input device from which an outer panel (exterior member) has been removed.
Figure 9:
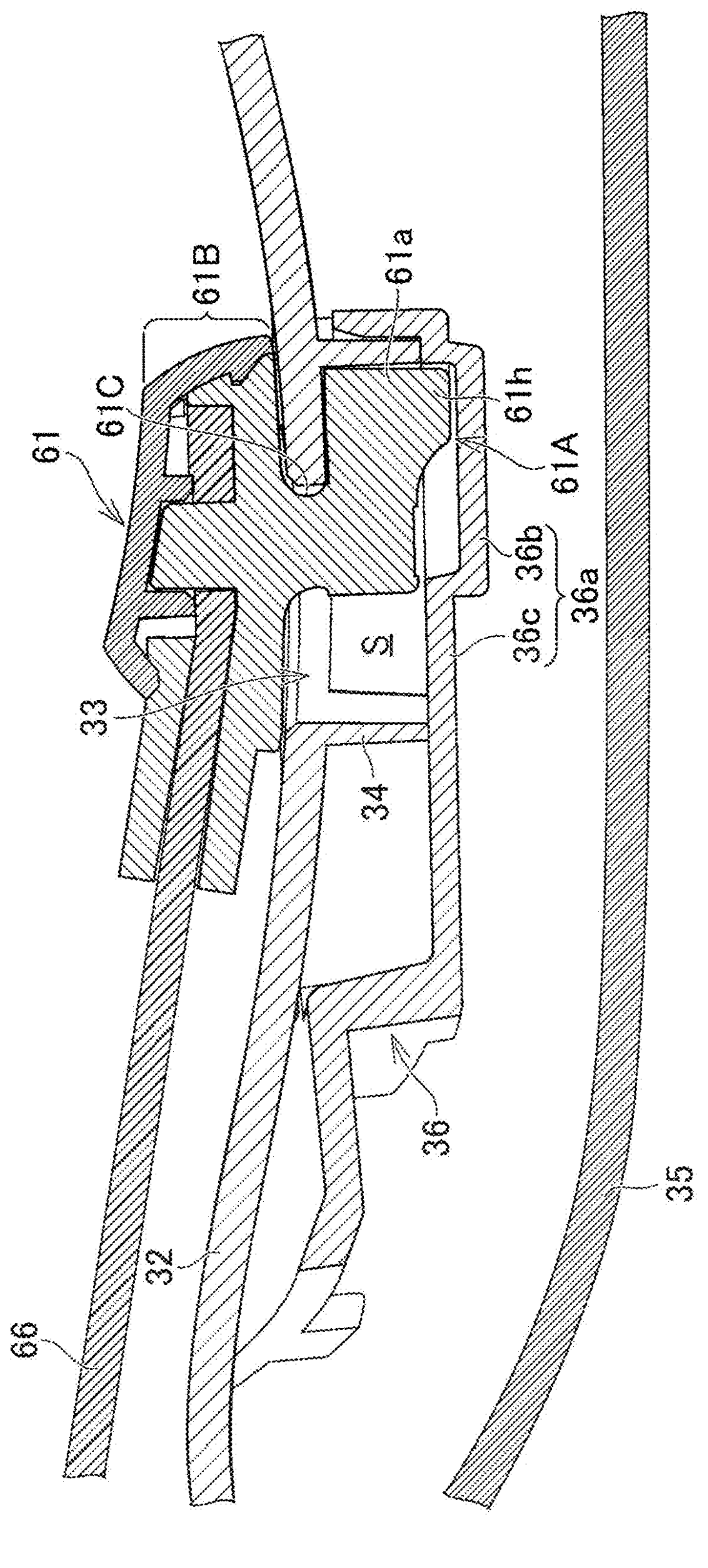
FIG. 9 is a cross-sectional view taken along line IX-IX illustrated in FIG. 8.

As illustrated in FIGS. 8 and 9, the input device 10 includes the inner panel 32 that forms the inner surface of the device rear part 31A and the device side part 31B, and the outer panel 35 that forms the outer surface of the device rear part 31A and the device side part 31B. Between the panels 32 and 35, the space S in which to dispose the fitting part 61A, LEDs forming the tracked portions H, and the like are disposed.

As illustrated in FIGS. 9 and 10, a peripheral wall 34 surrounding the attaching opening 33 may be formed on the inner panel 32. The fitting part 61A is disposed inside the peripheral wall 34 and is rotatable. Tips of the engagement protrusions 61*a*, 61*b*, and 61*c* may come in contact with an inner surface of the peripheral wall 34. With this arrangement, the inner side of the peripheral wall 34 functions as a guide used when the fitting part 61A is rotated. The peripheral wall 34 may be provided with a structure that engages with the fitting part 61A, restricts rotation of the fitting part 61A, or applies a load to the rotation of the fitting part 61A.

To be specific, as illustrated in FIG. 10, an over-rotation regulating portion 34*a* may be formed on the peripheral wall 34. The over-rotation regulating portion 34*a* protrudes inward from the peripheral wall 34. When the fitting part 61A is in the engagement position, the over-rotation regulating portion 34*a* interferes with one of the plurality of engagement protrusions 61*a*, 61*b*, and 61*c* (in the illustrated example, the second engagement protrusion 61*b*) and restricts further rotation of the fitting part 61A in the direction from the release position to the engagement position (F1 direction).

In the engagement position defined by the over-rotation regulating portion 34*a*, each of the engagement protrusions 61*a*, 61*b*, and 61*c* may be located exactly in the middle of two adjacent ones of the areas A1, A2, and A3. With this arrangement, when the fitting part 61A is in the engagement position, a sufficient engagement range can be secured between the engagement protrusions 61*a*, 61*b*, and 61*c* and the peripheral portion of the attaching opening 33. As illustrated in FIG. 10 and the like, the over-rotation regulating portion 34*a* may allow the angle between the engagement position and the release position of the fitting part 61A to be set to half the angle between two adjacent ones of the engagement protrusions 61*a*, 61*b*, and 61*c* (specifically, 60 degrees).

Further, a rotational-direction regulating portion 34*b* may be formed on the peripheral wall 34, as illustrated in FIG. 10.

The rotational-direction regulating portion 34*b* also protrudes inward from the peripheral wall 34. The rotational-direction regulating portion 34*b* interferes with one of the plurality of engagement protrusions 61*a*, 61*b*, and 61*c* (in the illustrated example, the third engagement protrusion 61*c*) when the fitting part 61A is in the release position, and restricts the rotation of the fitting part 61A in the direction opposite to the direction from the release position to the engagement position (direction F2). The rotational-direction regulating portion 34*b* may be formed along the edge of the third opening area A3 into which the third engagement protrusion 61*c* is fitted, for example.

Further, the peripheral wall 34 is provided with a return regulating portion 34*c*, as illustrated in FIG. 10. The return regulating portion 34*c* also protrudes inward from the peripheral wall 34. In the process of the fitting part 61A rotating from the engagement position to the release position, the return regulating portion 34*c* interferes with one of the plurality of engagement protrusions 61*a*, 61*b*, and 61*c* (in the illustrated example, the second engagement protrusion 61*b*) to prevent the fitting part 61A from returning to the release position without user's intention.

The amount of protrusion of the return regulating portion 34*c* is smaller than those of the other protrusions, namely, the over-rotation regulating portion 34*a* and the rotational-direction regulating portion 34*b*. Therefore, when the user rotates the fitting part 61A toward the release position with a certain force, the second engagement protrusion 61*b* surmounts the return regulating portion 34*c*, and the fitting part 61A can return to the release position.

As illustrated in FIG. 10, the return regulating portion 34*c* has two slopes 34*e* and 34*f* formed on the sides opposite to each other in the rotational direction of the fitting part 61A. The first slope 34*e* interferes with the second engagement protrusion 61*b* when the fitting part 61A rotates from the engagement position toward the release position. The second slope 34*f* interferes with the second engagement protrusion 61*b* when the fitting part 61A rotates from the release position toward the engagement position. The angle of the second slope 34*f* may be smaller than the angle of the first slope 34*e*. With this arrangement, a force required to rotate the fitting part 61A from the engagement position to the release position is greater than a force required to rotate the fitting part 61A from the release position to the engagement position. This shape of the return regulating portion 34*c* ensures both workability for attaching the fitting part 61A (easy rotation from the release position to the engagement position) and restriction on unintentional separation of the attached portion 61 from the input device 10. Incidentally, unlike the example described here, inclinations of the two slopes 34*e* and 34*f* may be the same.

Since the three regulating portions 34*a*, 34*b*, and 34*c* are formed on the peripheral wall 34, they interfere with the tips of the engagement protrusions 61*a*, 61*b*, and 61*c*. Therefore, a large moment can be applied to the fitting part 61A.

Note that the positions where the regulating portions 34*a*, 34*b*, and 34*c* are formed do not have to be the positions on the peripheral wall 34. For example, some or all of the regulating portions 34*a*, 34*b*, and 34*c* may be formed on the inner panel 32 in a region inside the peripheral wall 34. Moreover, only one of the regulating portions 34*a*, 34*b*, and 34*c* may be formed, or only any two of them may be formed.

Optimization of Orientation of Fitting Part

One of the plurality of engagement protrusions 61*a*, 61*b*, and 61*c* may have a shape different from those of the other engagement protrusions. With this arrangement, when the user fits the attached portion 61 into the attaching opening 33, the rotational position of the attached portion 61 around the center line C1 can be optimized.

For example, as illustrated in FIG. 6, an interference protrusion 61*h* that protrudes in the fitting direction N along the center line C1 may be formed on the first engagement protrusion 61*a*. Then, a protrusion like the interference protrusion 61*h* is not formed on the other engagement protrusions 61*b* and 61*c*.

Meanwhile, as illustrated in FIG. 9, the input device 10 has a bottom 36*a* that faces the fitting part 61A in the fitting direction N of the fitting part 61A, between the inner panel 32 and the outer panel 35. The bottom 36*a* may close an opening in the peripheral wall 34 (an opening that opens toward the outer panel 35). A recess 36*b* is formed on the bottom 36*a*. This recess 36*b* is formed at a position corresponding to the interference protrusion 61*h*. Further, the recess 36*b* is formed over a range in which the interference protrusion 61*h* of the first engagement protrusion 61*a* is transferred when the fitting part 61A rotates from the release position toward the engagement position or when the fitting part 61A rotates from the engagement position toward the release position. An interference step 36*c* that is higher (not recessed) than the recess 36*b* is formed in the bottom 36*a* in a region other than the recess 36*b*.

The interference protrusion 61*h* of the fitting part 61A and the bottom 36*a* can optimize the rotational position of the attached portion 61 around the center lines C1 and C2 (i.e., orientation of the attached portion 61 relative to the attaching opening 33) when the user fits the attached portion 61 into the attaching opening 33. For example, in the case where the first engagement protrusion 61*a* is located in the second opening area A2 or the third opening area A3 of the attaching opening 33, the interference protrusion 61*h* of the first engagement protrusion 61*a* abuts against the interference step 36*c*, and a part of the first engagement protrusion 61*a* does not enter the attaching opening 33. Therefore, the attached portion 61 cannot be rotated toward the engagement position. When the first engagement protrusion 61*a* is fitted into the first opening area A1 of the attaching opening 33, the interference protrusion 61*h* is positioned in the recess 36*b*, and the entire attached portion 61 enters the attaching opening 33. As a result, the rotation of the attached portion 61 toward the engagement position is permitted.

Since the correct orientation of the attached portion 61 is defined in this way, when the attached portion 61 is attached to the input device 10, the connecting cord 66 extending from the attached portion 61 is also arranged in the correct direction. For example, the connecting cord 66 can be prevented from being arranged to extend forward from the input device 10.

As illustrated in FIGS. 8 and 9, the input device 10 may include a frame 36 disposed between the inner panel 32 and the outer panel 35. The frame 36 may be formed into an annular shape to match the shape of the device rear part 31A, for example. A flexible substrate (not illustrated) on which LEDs, which are light emitting elements, are mounted may be attached to the frame 36, for example. The bottom 36*a* on which the interference step 36*c* and the recess 36*b* described above are formed may be formed integrally with the frame 36. This makes it possible to reduce the number of components.

Figure 11:
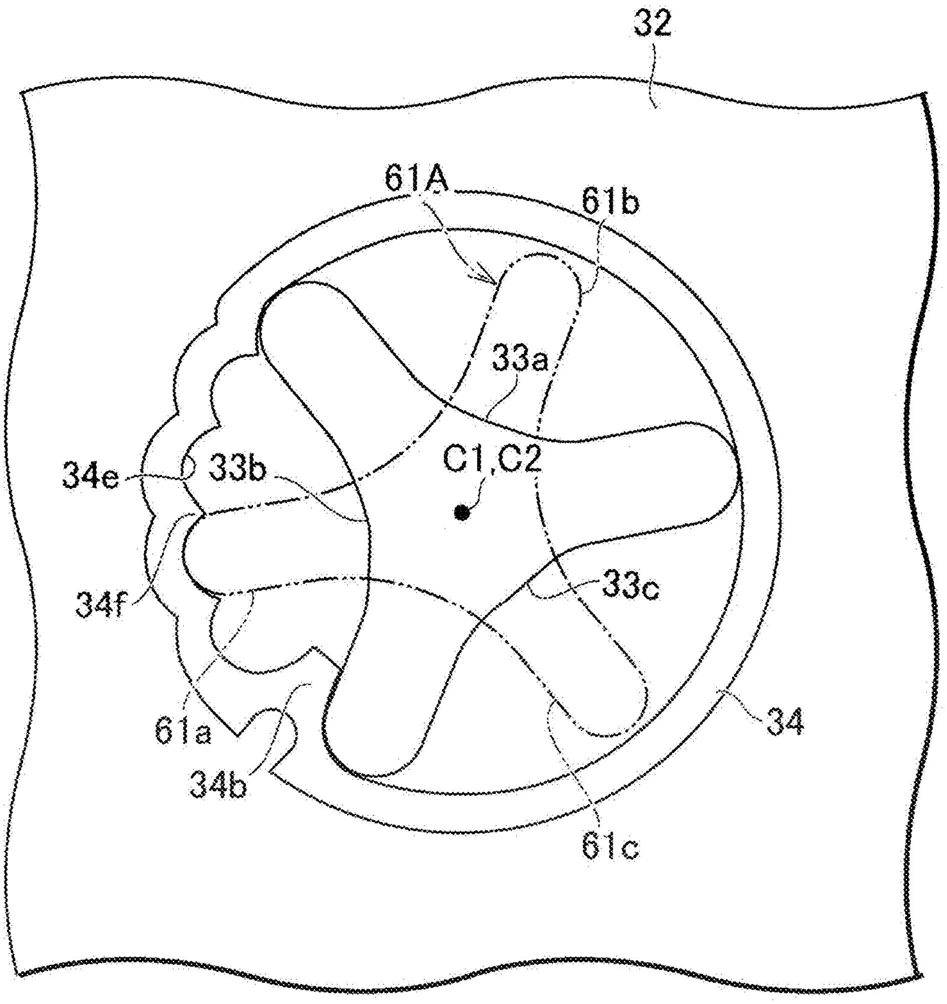
FIG. 11 is a diagram illustrating a modification example of the peripheral wall formed around the attaching opening.

FIG. 11 is a diagram illustrating a modification example of the peripheral wall 34. Also in the example illustrated in this figure, a rotational-direction regulating portion 34*b* is formed on the peripheral wall 34. The rotational-direction regulating portion 34*b* also protrudes inward from the peripheral wall 34. Further, in the example illustrated in this figure, a plurality of protrusions and recesses 34*e* and 34*f* are formed on the peripheral wall 34 in a row in a circumferential direction centering on the center line C2. The protrusions and recesses 34*e* and 34*f* interfere with the tip of the engagement protrusion 61*a* and restrict the movement of the attached portion 61 between the engagement position and the release position. That is, movement of the attached portion 61 that is not intended by the user is restricted between the engagement position and the release position.

Conclusion (1) As described above, the input device 10 includes the main body 11 having the grip 11B and the operating section 11A in which the input button 13 and the like are disposed, the outer surfaces 31*a* and 31*b* provided with the tracked portions H to be tracked by an external camera, the inner surfaces 31*c* and 31*e* that face the user's hand or wrist when the user is holding the grip 11B, and the attaching opening 33 that is provided in the inner surfaces 31*c* and 31*e* and to which the accessory component 60 is to be attached. According to this input device 10, when the accessory component 60 is attached to the attaching opening 33, the influence of the accessory component 60 on the detection of the tracked portions H by the camera can be reduced. It should be noted that, as long as the attached portion of the accessory component 60 can be attached, an attaching portion (for example, a portion protruding from the inner surfaces 31*c* and 31*e*) may be formed instead of the attaching opening 33.

(2) In the structure of item (1), the input device 10 has the device rear part 31A extending in the circumferential direction and the device side part 31B extending in a direction different from that of the device rear part 31A. The attaching opening 33 is formed in the inner surface at the connecting portion between the device rear part 31A and the device side part 31B. The force acting on the input device 10 from the accessory component 60 can be received by the strong connecting portion. Incidentally, here, the position of the attaching opening 33 in the extending direction (front-rear direction) of the device side part 31B is not limited to any particular position. That is, the attaching opening 33 may be located at a position close to the rear edge 31*d* of the device rear part 31A in the connecting portion between the device rear part 31A and the device side part 31B, or may be located at a position on the device side part 31B frontward away from the rear edge 31*d* of the device rear part 31A.

(3) In the structure of item (1) or (2), the input device 10 includes the device rear part 31A and the device side part 31B that are located rearward of the operating section 11A and that have the inner surfaces 31*c* and 31*e* and the outer surfaces 31*a* and 31*b*. The attaching opening 33 is formed in the inner surfaces 31*c* and 31*e* of the device rear part 31A and the device side part 31B. With this arrangement, since the accessory component 60 is disposed rearward of the operating section 11A, the accessory component 60 can be prevented from interfering with the operation when the input device 10 is used.

(4) In the structure of any one of items (1) to (3), the input device 10 has the device rear part 31A having such a shape that surrounds the hand or wrist of the user who is holding the grip 11B. With this arrangement, the visibility of the tracked portions H can be improved.

(5) In the structure of item (4), the input device 10 has the device side part 31B extending forward from the device rear part 31A. The attaching opening 33 is formed in the inner surface at the connecting portion between the device rear part 31A and the device side part 31B. The force acting on the input device 10 from the accessory component 60 can be received by the strong connecting portion.

(6) In the structure of any one of items (1) to (5), the attaching opening 33 and the attached portion 61 of the accessory component 60 are attachable to and detachable from each other. The attaching opening 33 and the attached portion 61 of the accessory component 60 are rotatable relative to each other around the center lines C1 and C2 extending in the attachment/detachment direction N of the attaching opening 33 and the attached portion 61. The attaching opening 33 and the attached portion 61 of the accessory component 60 are rotatable relative to each other around the center lines C1 and C2, between the engagement position where they engage with each other and the release position where they are disengaged from each other. With this arrangement, the work of attaching and detaching the accessory component 60 can be facilitated.

(7) In the structure of any one of items (1) to (6), formed as an attaching portion is the attaching opening 33 that is formed in the inner surfaces 31*c* and 31*e* and into which the attached portion 61 can be fitted. With this arrangement, when the attached portion 61 is not attached to the attaching opening 33, interference between the hand and the attaching portion can be avoided.

(8) In the structure of any one of items (1) to (7), the attaching opening 33 has the first opening area A1 extending from the center line C2 in the first direction perpendicular to the center line C2 and the second opening area A2 extending from the center line C2 in the second direction perpendicular to the center line C2. The inner edge 33*a* of the attaching opening 33 connecting the tip of the first opening area A1 and the tip of the second opening area A2 protrudes toward the center line C2 with respect to the straight line L4 connecting the tip of the first opening area A1 and the tip of the second opening area A2. With this arrangement, when the attached portion 61 is attached to the attaching opening 33, the engagement range between the engagement protrusion 61*a* and the peripheral portion of the attaching opening 33 can be increased, and attachment strength can be ensured.

(9) The accessory component 60 has the attached portion 61 having the fitting part 61A to be fitted into the attaching opening 33 formed in the input device 10, and the base 61B. The fitting part 61A has the first engagement protrusion 61*a* that protrudes in the first direction (D1) perpendicular to the fitting direction N of the fitting part 61A into the attaching opening 33. The base 61B covers the first engagement protrusion when the attached portion 61 is viewed in the fitting direction, and the gap G1 is secured between the base 61B and the first engagement protrusion 61*a*. With this shape of the attached portion 61, the attached portion 61 can easily be attached to the input device 10. To be specific, by sandwiching the inner edge of the attaching opening 33 between the first engagement protrusion 61*a* and the base 61B, to cause the first engagement protrusion 61*a* to engage with the peripheral part of the attaching opening 33, the accessory component 60 can be attached to the input device 10.

(10) In the structure of item (9), the fitting part 61A has the second engagement protrusion 61*b* protruding in the second direction (D2) perpendicular to the fitting direction N. The outer edge 61*e* of the fitting part extending from the vertex of the first engagement protrusion 61*a* to the vertex of the second engagement protrusion 61*b* is curved toward the center of the fitting part 61A with respect to the straight line L1 connecting the vertex of the first engagement protrusion and the vertex of the second engagement protrusion. With this arrangement, the engagement range between the engagement protrusions 61$a$ and 61$b$ and the peripheral portion of the attaching opening 33 can be increased.

(11) In the structure of item (10), the fitting part 61A has the third engagement protrusion 61$c$ protruding in the third direction (D3) perpendicular to the fitting direction N. The outer edge 61$f$ of the fitting part 61A extending from the vertex of the first engagement protrusion 61$a$ to the vertex of the third engagement protrusion 61$c$ is curved toward the center of the fitting part 61A with respect to the straight line L2 connecting the vertex of the first engagement protrusion 61$a$ and the vertex of the third engagement protrusion 61$c$. With this arrangement, the engagement range between the engagement protrusions 61$a$ and 61$b$ and the peripheral portion of the attaching opening 33 can be increased.

(12) In the structure of any one of items (9) to (11), the shape of the first engagement protrusion 61$a$ and the shape of the second engagement protrusion 61$b$ are different from each other. With this arrangement, when the user fits the attached portion 61 into the attaching opening 33, the rotational position of the attached portion 61 around the center line C1 can be made appropriate.

(13) In the structure of any one of items (9) to (12), only one of the first engagement protrusion 61$a$ and the second engagement protrusion 61$b$ has the interference protrusion 61$h$ formed to protrude in the fitting direction N. With this arrangement, when the user fits the attached portion 61 into the attaching opening 33, the rotational position of the attached portion 61 around the center line C1 can be made appropriate. Note that a recess depressed in the fitting direction N may be formed on the first engagement protrusion 61$a$, instead of the interference protrusion 61$h$, and such a recess does not have to be formed in the other engagement protrusions 61$b$ and 61$c$.

(14) The input device assembly includes the input device 10 and the accessory component 60 that is attachable to and detachable from the input device 10. The attaching opening 33 is formed in the input device 10. The accessory component 60 has the attached portion 61 to be attached to the attaching opening 33. The attached portion 61 has the fitting part 61A to be fitted into the attaching opening 33, and the base 61B. The fitting part 61A has the first engagement protrusion 61$a$ that protrudes in the first direction (D1) perpendicular to the fitting direction N in which the fitting part 61A is fitted into the attaching opening 33. The base 61B covers the first engagement protrusion 61$a$ when the attached portion 61 is viewed in the fitting direction N, and the gap G1 is secured between the base 61B and the first engagement protrusion 61$a$. The attaching opening 33 has a shape corresponding to the fitting part 61A. The attached portion 61 is rotatable relative to the attaching opening 33 around the center lines C1 and C2 extending in the fitting direction N, between the engagement position and the release position. In the release position, attachment and detachment of the attaching opening 33 and the attached portion 61 are allowed. In the engagement position, the edge of the attaching opening 33 is disposed in the gap G1 between the base 61B and the first engagement protrusion 61$a$, thereby causing the fitting part 61A to engage with the peripheral portion of the attaching opening 33. According to this input device assembly, the work of attaching and detaching the accessory component 60 to and from the attaching opening 33 of the input device 10 can be facilitated.

Modification Example

It is to be noted that the input device, the accessory component, and the input device assembly proposed in the present disclosure are not limited to the examples described above.

For example, the accessory component does not have to include the connecting cord 66. That is, the accessory component does not have to be a strap. For example, the accessory component may be a decorative cover that covers the outer surface of the input device, or a device that expands the functionality of the input device (e.g., another input device with a plurality of input buttons).

The invention claimed is:

1. An input device that is used while being worn by a user, the input device comprising:

a main body having an operating section in which an input member is disposed;

an outer surface provided with a tracked portion to be tracked by an external device;

an inner surface that surrounds a hand or wrist of the user when the device is worn on the user; and an attaching portion that is provided on the inner surface, wherein the attaching portion is attachable to and detachable from an attached portion of an accessory component, wherein:

the attaching portion is rotatable relative to the attached portion of the accessory component around a center line extending in an attachment and detachment direction of the attached portion of the accessory component, and the attaching portion is rotatable around the center line relative to the attached portion of the accessory component between an engagement position where the attaching portion and the attached portion are engaged with each other and a release position where the attaching portion and the attached portion are disengaged from each other.

2. The input device according to claim 1, comprising:

a first part extending in a first direction;

a second part extending in a second direction from the first part, wherein at least a part of the attaching portion is located on an inner surface at a connecting portion between the first part and the second part.

3. The input device according to claim 1, comprising:

a part that is located rearward of the operating section and that has the inner surface and the outer surface, wherein the attaching portion is provided on the inner surface of the part.

4. The input device according to claim 1, wherein the main body further has a grip, and the part has a device rear part that is shaped to surround the hand or wrist of the user holding the grip.

5. The input device according to claim 4, comprising:

a device side part extending forward from the device rear part, wherein the attaching portion is formed on an inner surface at a connecting portion between the device rear part and the device side part.

6. The input device according to claim 1, wherein the attaching portion has an opening that is formed in the inner surface and into which the attached portion is capable of being fitted.

7. The input device according to claim 1, wherein the opening includes a first opening area extending from the center line in a first direction intersecting the center line and a second opening area extending from the center line in a second direction intersecting the center line, and an inner edge of the opening connecting a tip of the first opening area and a tip of the second opening area protrudes toward the center line with respect to a straight line connecting the tip of the first opening area and the tip of the second opening area.

8. An accessory component capable of being attached to and detached from an input device, the accessory component comprising:

an attached portion having a fitting part to be fitted into an attaching opening formed in the input device and a base, wherein the fitting part comprising a first engagement protrusion that protrudes in a first direction that intersects a fitting direction of the fitting part into the attaching opening, a second engagement protrusion protruding in a second direction intersecting the fitting direction, and a third engagement protrusion protruding in a third direction intersecting the fitting direction, the base covers the first engagement protrusion when the attached portion is viewed in the fitting direction, a gap is secured between the base and the first engagement protrusion, a first outer edge of the fitting part extending from a vertex of the first engagement protrusion to a vertex of the second engagement protrusion is curved toward a center of the fitting part with respect to a straight line connecting the vertex of the first engagement protrusion and the vertex of the second engagement protrusion, and a second outer edge of the fitting part extending from the vertex of the first engagement protrusion to a vertex of the third engagement protrusion is curved toward the center of the fitting part with respect to a straight line connecting the vertex of the first engagement protrusion and the vertex of the third engagement protrusion.

9. The accessory component according to claim 8, wherein the fitting part has a second engagement protrusion protruding in a second direction intersecting the fitting direction, and a shape of the first engagement protrusion and a shape of the second engagement protrusion are different from each other.

10. The accessory component according to claim 8, wherein a protrusion protruding in the fitting direction or a recess depressed in the fitting direction is formed on only one of the first engagement protrusion and the second engagement protrusion.

11. An input device assembly comprising:

an input device; and an accessory component capable of being attached to and detached from the input device, wherein an attaching opening is formed in the input device, the accessory component has an attached portion to be attached to the attaching opening, the attached portion has a fitting part to be fitted into the attaching opening and a base, the fitting part has a first engagement protrusion that protrudes in a first direction intersecting a fitting direction of the fitting part into the attaching opening, the base covers the first engagement protrusion when the attached portion is viewed in the fitting direction, with a gap secured between the base and the first engagement protrusion, the attaching opening has a shape corresponding to the fitting part, the attached portion is rotatable relative to the attaching opening around a stop line extending in the fitting direction, between an engagement position and a release position, attachment and detachment of the attaching opening and the attached portion are allowed in the release position, and, in the engagement position, an edge of the attaching opening is disposed in the gap between the base and the first engagement protrusion, thereby causing the fitting part to engage with a peripheral portion of the attaching opening.

* * * * *